(12) United States Patent
Lord et al.

(10) Patent No.: US 7,093,985 B2
(45) Date of Patent: Aug. 22, 2006

(54) WALL MOUNT FIBER OPTIC CONNECTOR AND ASSOCIATED METHOD FOR FORMING THE SAME

(75) Inventors: Randal Bruce Lord, Rogersville, TN (US); Robert Marc Scharf, Kingsport, TN (US)

(73) Assignee: Protokraft, LLC, Kingsport, TN (US)

( * ) Notice: Subject to any disclaimer, the term of this patent is extended or adjusted under 35 U.S.C. 154(b) by 100 days.

(21) Appl. No.: 10/889,148

(22) Filed: Jul. 12, 2004

(65) Prior Publication Data

US 2006/0008213 A1    Jan. 12, 2006

(51) Int. Cl.
G02B 6/36    (2006.01)

(52) U.S. Cl. .............................. 385/89; 385/88; 385/92; 385/94

(58) Field of Classification Search ................ 385/89
See application file for complete search history.

(56) References Cited

U.S. PATENT DOCUMENTS

| | | | |
|---|---|---|---|
| 4,595,839 A | 6/1986 | Braun et al. ................ 250/551 |
| 5,596,665 A * | 1/1997 | Kurashima et al. ........... 385/92 |
| 5,610,749 A * | 3/1997 | Mizoguchi et al. .......... 398/166 |
| 6,004,044 A | 12/1999 | Paulus et al. ................. 385/88 |
| 6,614,838 B1 | 9/2003 | Bremer ....................... 375/220 |
| 6,659,655 B1 | 12/2003 | Dair et al. ..................... 385/92 |
| 6,661,565 B1 | 12/2003 | Shaw et al. .................. 359/297 |
| 6,816,376 B1 * | 11/2004 | Bright et al. ................ 361/704 |
| 6,913,402 B1 * | 7/2005 | Bohlin et al. .................. 385/93 |
| 2001/0024551 A1 * | 9/2001 | Yonemura et al ............ 385/88 |
| 2002/0168148 A1 | 11/2002 | Gilliland et al. .............. 385/59 |
| 2003/0072539 A1 | 4/2003 | Huang et al. .................. 385/92 |
| 2003/0091349 A1 | 5/2003 | Sato et al. ................... 398/135 |
| 2003/0118293 A1 | 6/2003 | Canace et al. ................ 385/92 |
| 2003/0198445 A1 | 10/2003 | Inujima et al. ................ 385/92 |
| 2003/0223708 A1 | 12/2003 | Kurashima et al. ........... 385/92 |
| 2004/0008954 A1 | 1/2004 | Shaw et al. ................... 385/92 |
| 2004/0022487 A1 | 2/2004 | Nagasaka et al. ............. 385/31 |
| 2004/0037517 A1 | 2/2004 | Dair et al. ..................... 385/92 |
| 2004/0037518 A1 | 2/2004 | Coffey et al. ................. 385/92 |
| 2004/0047564 A1 | 3/2004 | Chiu et al. .................... 385/53 |

FOREIGN PATENT DOCUMENTS

| | | |
|---|---|---|
| DE | 10023463 | 12/2001 |
| FR | 2691264 | 11/1993 |

OTHER PUBLICATIONS

Active Bulkhead Products, Stratos Lightwave, Jun. 17, 2003, available at www.stratoslightwave.com.
Fiber Systems International, Fiber Optic Solutions, 2002-2003, available at www.fibersystems.com.

* cited by examiner

*Primary Examiner*—Frank G. Font
*Assistant Examiner*—Ryan Lepisto
(74) *Attorney, Agent, or Firm*—Allen, Dyer, Doppelt, Milbrath & Gilchrist, P.A.

(57) ABSTRACT

A wall mount fiber optic connector includes a connector body portion to be mounted on a wall of an electronic system, and the connector body portion has ferrule-receiving passageways therein. Opto-electronic (O/E) converters are coupled to the ferrule-receiving passageways, with each O/E converter being associated with a respective ferrule-receiving passageway. Biasing members are coupled to the O/E converters, with each biasing member urging a respective O/E converter forward. The wall mount fiber optic connector also includes flexible circuits, with each flexible circuit having a first end coupled to a respective O/E converter. A printed circuit board is coupled to second ends of the flexible circuits. An electrical connector portion is carried by the connector body portion and is coupled to the printed circuit board.

37 Claims, 7 Drawing Sheets

WALL MOUNT FIBER OPTIC CONNECTOR AND ASSOCIATED METHOD FOR FORMING THE SAME

FIELD OF THE INVENTION

The present invention relates to the field of connectors, and more particularly, to a wall mount fiber optic connector.

BACKGROUND OF THE INVENTION

Fiber optic cabling is used in various types of air, space, land and sea-based platforms to provide high-speed data communications for on-board electronic systems, such as radar and mission control computer systems. In a typical wall mount fiber optic connector, the receptacle connector portion is connected to the wall mount of the electronic system and extends rearwardly within an overall housing or system chassis of the electronic system. The mating plug connector portion is removably positioned into the receptacle connector portion from the outside of the housing.

Such typical wall mount fiber optic connectors are passive connectors, and consequently, these connectors merely pass the optical signals through the connector. Passive connectors require fiber optic cabling within the electronic system from the connector to opto-electronic (O/E) converters. O/E converters convert electrical signals to optical signals, and optical signals to electrical signals. When routing each optical fiber from the wall mount fiber optic connector to an appropriate O/E converter within the housing, several problems are encountered.

First, a minimum cable bend radius should be observed within the housing to avoid cracking the glass fiber. Second, each time an optical signal passes through a connector interface, the power level of the optical energy is reduced, which subtracts from the overall optical link budget of the electronic system.

In expanded function electronic systems, the optical fiber from the wall mount fiber optic connector may be routed through an optical fiber backplane within the housing, which then routes the optical fibers to specific locations on an electrical backplane that is also within the housing. Circuit boards containing the O/E converters connect through the electrical backplane to the optical fiber backplane. The use of an optical fiber backplane within the housing adds to the cost, weight and complexity of each electronic system, as well as to the overall volume of the system.

In an attempt to address the above noted problems, active fiber optic connectors are available. These connectors include O/E converters as part of the connectors for converting between the two signal types within the connector itself. For example, U.S. Pat. No. 5,596,665 to Kurashima et al. discloses such a fiber optic connector having a generally rectangular housing and includes receptacle connector portions to receive mating plug connector portions, and circuitry within the housing converts optical signals to electrical signals and vice-versa. The fiber optic connector is designed for easy assembly and includes reference surfaces and bias members to permit insertion of the fiber optic sleeves. However, the fiber optic connector in Kurashima et al. is not a wall mount fiber optic connector.

Another active fiber optic connector is disclosed in U.S. Patent Application No. 2003/0118293 to Canace et al. The connector may be mounted to a bulkhead or wall, and includes fingers, to provide resilience for leeway in the positioning of the connector relative to the wall in the direction of the optical axis of the optical fibers. Flexible circuit boards are also used to mount the components within the housing. Unfortunately, this active fiber optic connector is not particularly well suited for harsh environments. Maintaining alignment of the optical fibers in the plug connector portion with the O/E converters in the receptacle connector portion is a problem under harsh environments, which are typically encountered in various types of air, space, land and sea-based platforms.

SUMMARY OF THE INVENTION

In view of the foregoing background, it is therefore an object of the present invention to provide an active wall mount fiber optic connector that is reliable in harsh environments.

This and other objects, features, and advantages in accordance with the present invention are provided by a wall mount fiber optic connector comprising a connector body portion to be mounted on a wall, with the connector body portion having at least one ferrule-receiving passageway therein. The wall mount fiber optic connector further comprises at least one opto-electronic (O/E) converter associated with the at least one ferrule-receiving passageway.

The wall mount fiber optic connector may further comprise at least one biasing member urging the at least one O/E converter forward. There is also at least one flexible circuit having a first end coupled to the at least O/E converter. At least one printed circuit board may be coupled to a second end of the at least one flexible circuit. An electrical connector portion carried by said connector body portion may be coupled to the at least one printed circuit board.

The connector body portion may be cylindrically shaped. The connector body portion may comprise a wall mount flange, a subassembly retainer carried by the wall mount flange and retaining the O/E converters therein, and an end cover removably coupled to an end of the subassembly retainer. The subassembly retainer and the wall mount flange may have a keyed fitting arrangement therebetween to ensure that the O/E converters will be aligned with the corresponding ferrule-receiving passageways in the connector body portion.

Each respective biasing member may comprise a spring under compression. The wall mount fiber optic connector may further comprise a spring plate between the flexible circuits and the O/E converters. Each spring is between the spring plate and a corresponding O/E converter. Since each O/E converter is urged towards a corresponding ferrule-receiving passageway, this advantageously allows independent movement with respect to one another, which is beneficial when operating in a harsh environment. The axial movement of each O/E converter also allows the ferrules in the mating plug connector portion to be fixed.

Each O/E converter also comprises a plurality of conductive leads extending rearwardly therefrom and being coupled to a corresponding flexible circuit. The spring plate may include a plurality of openings therein aligned with the plurality of conductive leads. Since each O/E converter is connected to a flexible circuit that is separate from the other flexible circuits, this advantageously ensures electrical continuity during axial movement of the O/E converters, which is also beneficial when operating in a harsh environment.

In another embodiment, each respective biasing member may comprise a spring under tension. The at least one printed circuit board may comprise a forward printed circuit board coupled to the flexible circuits, and a rearward printed circuit board coupled to the electrical connector portion.

The O/E converters may comprise at least one transmitter optical subassembly (TOSA) for converting electrical signals to optical signals, and at least one receiver optical subassembly (ROSA) for converting optical signals to electrical signals. Each O/E converter may also comprise either a serializer/deserializer or a deserializer/serializer for converting the optical and electrical signals between a serial and parallel format and vice-versa.

Another aspect of the present invention is directed to an electronic system comprising a housing including a wall, an electrical circuit carried by the housing, and at least one wall mount fiber optic connector as defined above mounted to the wall. The electronic system also comprises an electrical cable between the electrical circuit and the wall mount fiber optic connector.

Yet another aspect of the present invention is directed to a method for making a wall mount fiber optic connector as defined above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
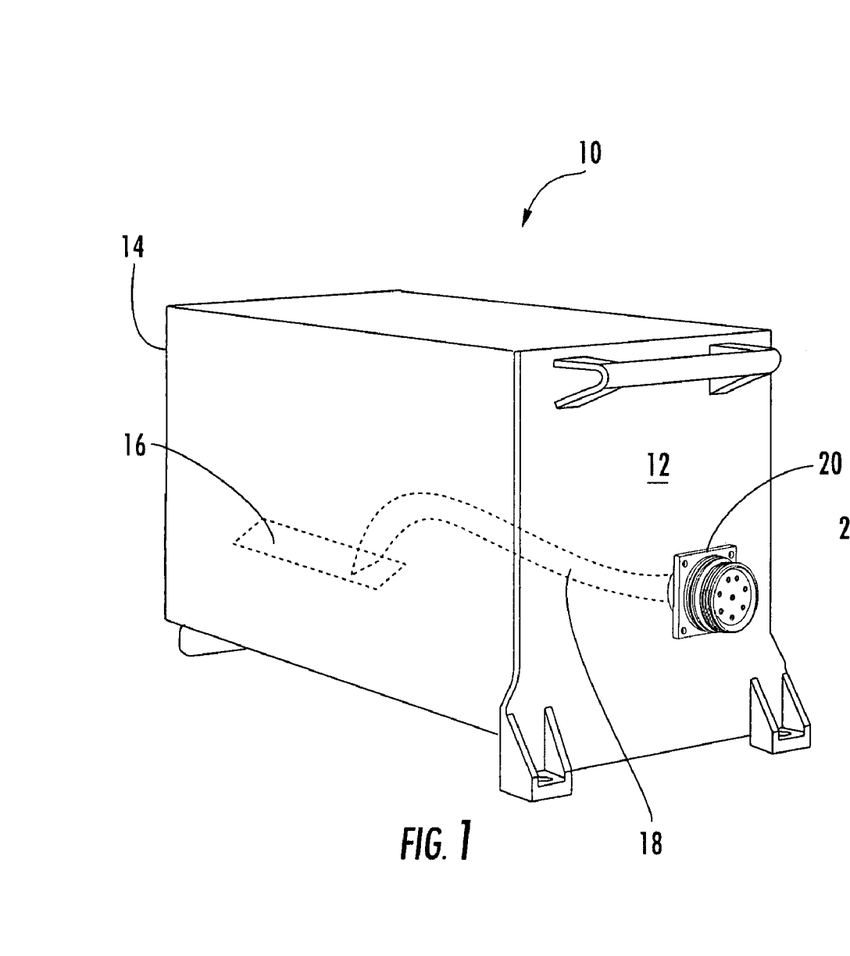
FIG. 1 is a perspective view of an electronic system with a wall mount fiber optic connector in accordance with the present invention.
Figure 2:
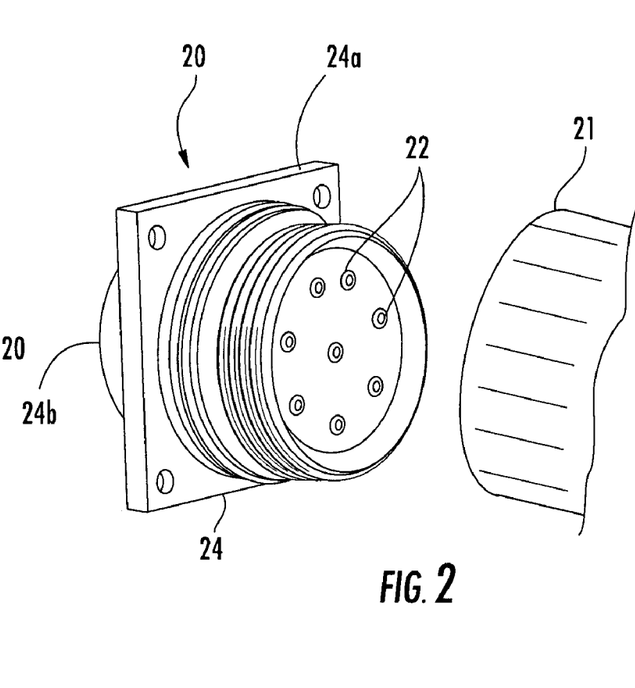
FIG. 2 is a perspective end view of the wall mount fiber optic connector illustrated in FIG. 1 and a corresponding mating connector.

An electronic system 10 having at least one wall mount fiber optic connector 20 mounted to a wall 12 thereof will initially be discussed with reference to FIGS. 1 and 2. The electronic system 10 comprises a housing or system chassis 14, and the housing carries an electrical circuit 16 which interfaces with the wall mount fiber optic connector 20 via an electrical cable 18. The illustrated electrical cable 18 is a flexible printed circuit.

The electronic system 10 interfaces with fiber optics external the system via the wall mount fiber optic connector 20, and the system is not limited to any particular function. Depending on the intended application, the electronic system 10 may be a radar system, a sonar system, a navigation system or a mission computer system, for example. The wall mount fiber optic connector 20 may support both transmit and receive functions as illustrated in the figures, or the connector may be configured so that it only supports transmit or receive functions.

The electronic system 10 is to be installed in various types of air, space, land and sea-based platforms. Any one of these platforms typically subjects the electronic system 10 to a harsh environment, in which temperature profiles and vibration levels can be extreme. Since the electronic system 10 is designed to operate in a harsh environment, the wall mount fiber optic connector 20 is to be equally reliable, particularly since fiber optics are involved.

As will be discussed in greater detail below, the wall mount fiber optic connector 20 in accordance with the present invention is an active connector because it converts optical signals to electrical signals, and electrical signals to optical signals on respective receive and transmit paths within the connector itself. The wall mount fiber optic connector 20 mounted on the wall 12 of the electronic system is commonly referred to as the receptacle connector portion, and includes a plurality of ferrule-receiving passageways 22 therein for mating with the ferrule from a corresponding plug connector portion 21.

The illustrated wall mount fiber optic connector 20 is designed to be compliant with the following industry design standards: MIL-STD-38999, MIL-STD-1560A and MIL-STD-29504/4, which are incorporated herein by reference. These industry design standards ensure commonality and compatibility among different suppliers and manufacturers. Nonetheless, the wall mount fiber optic connector 20 may be configured so that it is compliant with other industry design standards, as readily appreciated by those skilled in the art.

Figure 3:
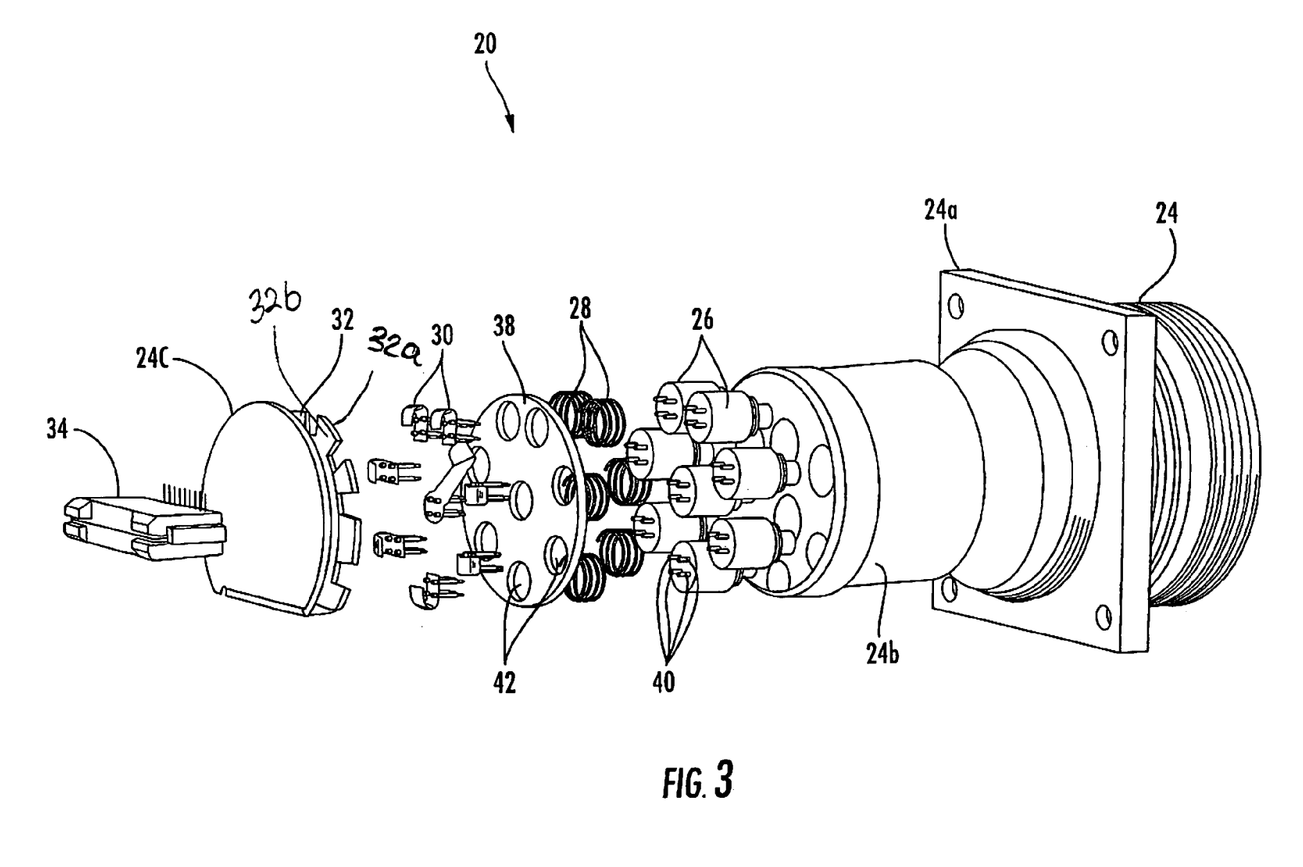
FIG. 3 is an exploded perspective view of the wall mount fiber optic connector in accordance with the present invention.
Figure 4:
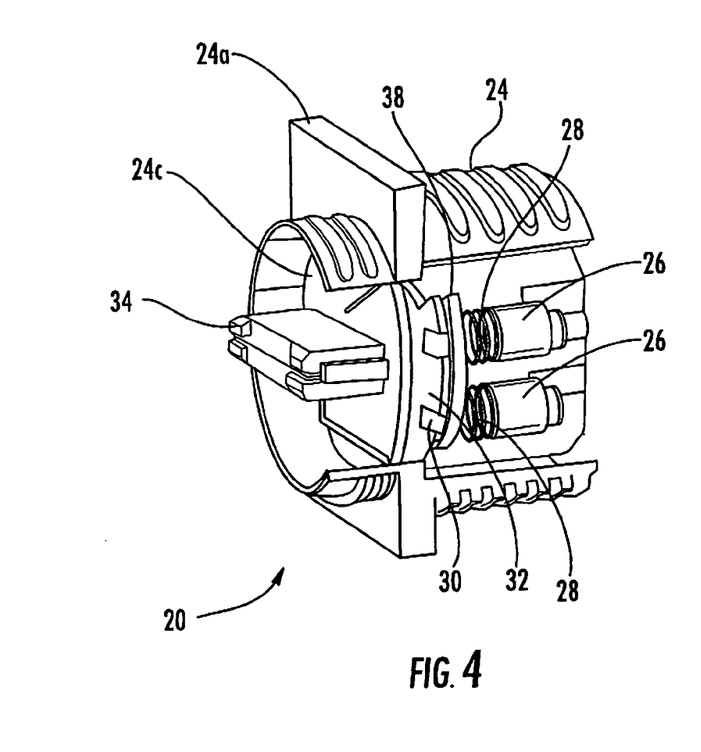
FIG. 4 is a cutaway view of the wall mount fiber optic connector in accordance with the present invention.

Referring now to FIGS. 3 and 4, the wall mount fiber optic connector 20 will be discussed in greater detail. The wall mount fiber optic connector 20 comprises a connector body portion 24 that is mounted on the wall 12 of the electronic system 10. As noted above, the connector body portion 24 includes a plurality of ferrule-receiving passageways 22 therein. A plurality of opto-electronic (O/E) converters 26 are coupled to the plurality of ferrule-receiving passageways 22, and each O/E converter has an optical path aligned with a corresponding ferrule-receiving passageway. A respective biasing member 28 urges each O/E converter 26 forward, i.e., toward a corresponding ferrule-receiving passageway 22. Each respective biasing member 28 allows the O/E converter 26 to be compressed and maintained in alignment with a corresponding ferrule-receiving passageway 22.

The wall mount fiber optic connector 20 also comprises a plurality of flexible circuits 30 coupled to the plurality of O/E converters 26. At least one printed circuit board 32 is coupled to the plurality of flexible circuits 30. The illustrated printed circuit board 32 comprises a forward printed circuit board 32a coupled to the plurality of flexible circuits 30, and a rearward printed circuit board 32b coupled to an electrical connector portion 34. The actual number of printed circuit boards may be more or less depending on the intended application. The flexible printed circuit 18 interfaces between the electrical connector portion 34 and the electrical circuit 16 within the housing 14.

The illustrated connector body portion 24 is cylindrically shaped. However, the connector body portion 24 may be a different shape depending on the intended application, such as rectangular for example. The connector body portion 24 comprises a wall mount mounting flange 24a, a subassembly retainer 24b carried by the wall mount mounting flange and retaining the O/E converters 26 therein, and an end cover 24c removably coupled to an end of the subassembly retainer. The subassembly retainer 24b and the wall mount mounting flange 24a have a keyed fitting arrangement therebetween. This ensures that the plurality of O/E converters 26 will be aligned with the corresponding ferrule-receiving passageways 24 in the connector body portion.

In one embodiment, each respective biasing member 28 comprises a spring under compression. A spring plate 38 is between the plurality of flexible circuits 30 and the plurality of O/E converters 26. Each spring 28 is between the spring plate 38 and a corresponding O/E converter 26. Since each O/E converter 26 is urged towards a corresponding ferrule-receiving passageway 22, this advantageously allows independent movement with respect to one another, which is beneficial when operating in a harsh environment. The axial movement of each O/E converter 26 also allows the ferrules in the mating plug connector portion to be fixed.

Figure 5:
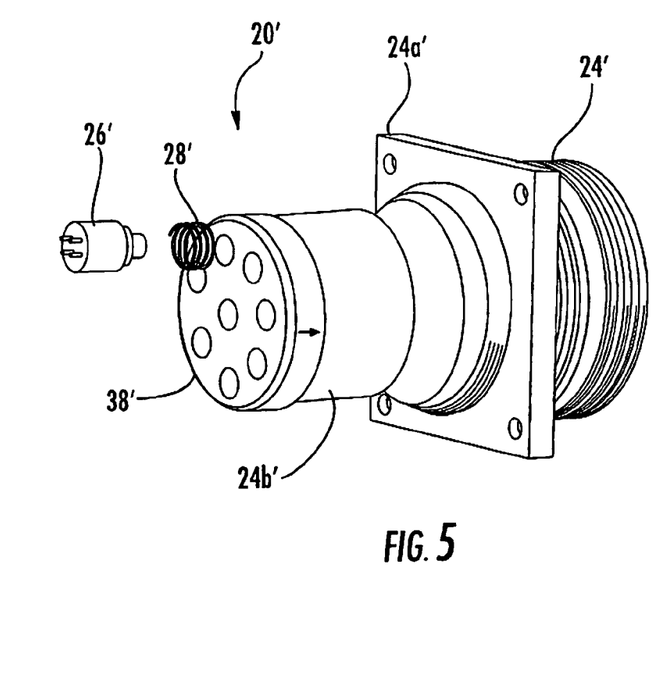
FIG. 5 is an exploded perspective view of another embodiment of the biasing member illustrated in FIGS. 3 and 4.

In another embodiment, each respective biasing member 28' comprises a spring under tension. As best illustrated in FIG. 5, the spring plate 38' is positioned in the inner most portion of the subassembly retainer 24b'. To simplify this figure, not all of the components of the wall mount fiber optic connector 20' are shown. Each spring 28' is attached between the spring plate 38' and a corresponding O/E converter 26'. This results in each spring 28' pulling an O/E converter 26' towards a corresponding optical path.

Instead of pushing the O/E converters 26 in a forward direction toward the optical paths (i.e., when the springs 28 are under compression), the O/E converters 26' may be pulled in the forward direction (i.e., when the springs 28' are under tension). The different biasing members 28, 28' are for illustrative purposes, and other types of biasing members may be used, as readily appreciated by those skilled in the art.

Referring back to FIG. 3, each O/E converter 26 comprises a plurality of pins or conductive leads 40 extending therefrom, and which are coupled to a corresponding flexible circuit 30. The spring plate 28 includes a plurality of openings 42 aligned with the plurality of conductive leads 40 so that the conductive leads extend therethrough. Since each O/E converter 26 is connected to a flexible circuit 30 that is separate from the other flexible circuits, this advantageously ensures electrical continuity during axial movement of the O/E converters 26, which is also beneficial when operating in a harsh environment.

Figure 8:
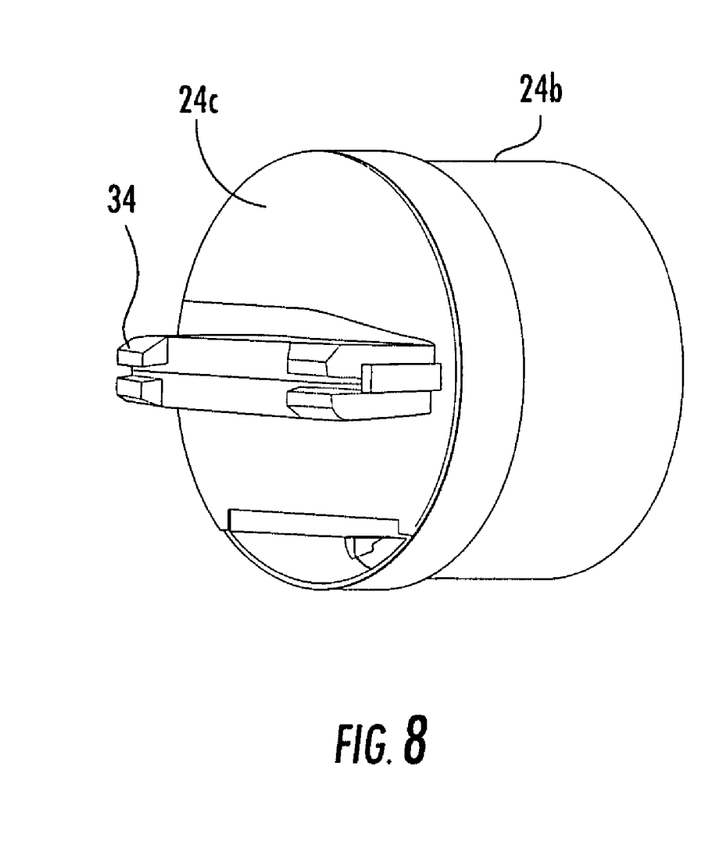
Figure 9:
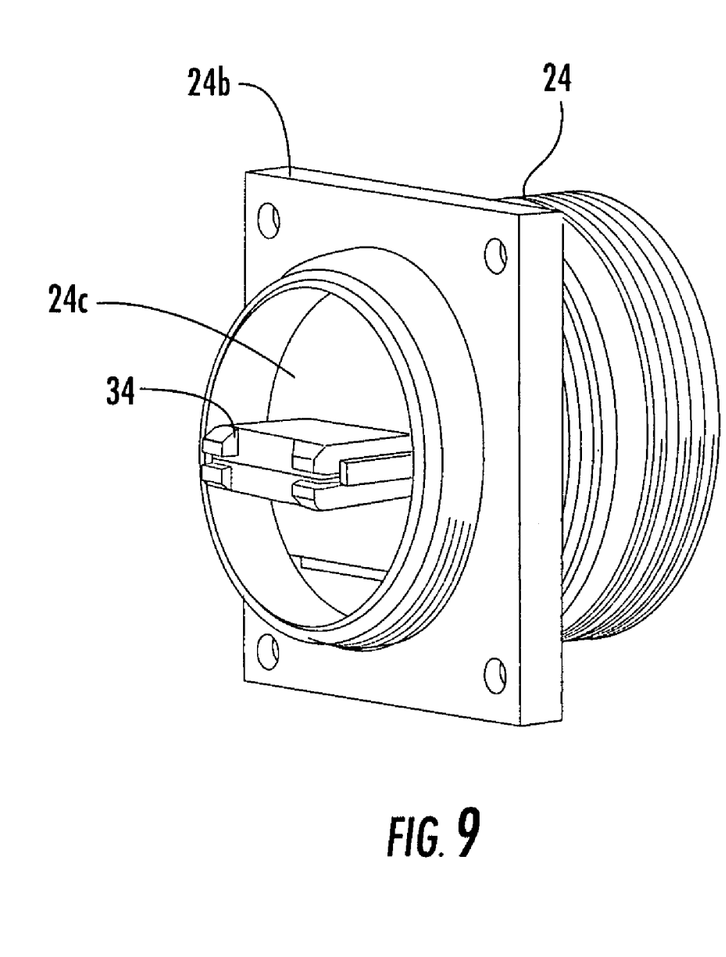
Figure 10:
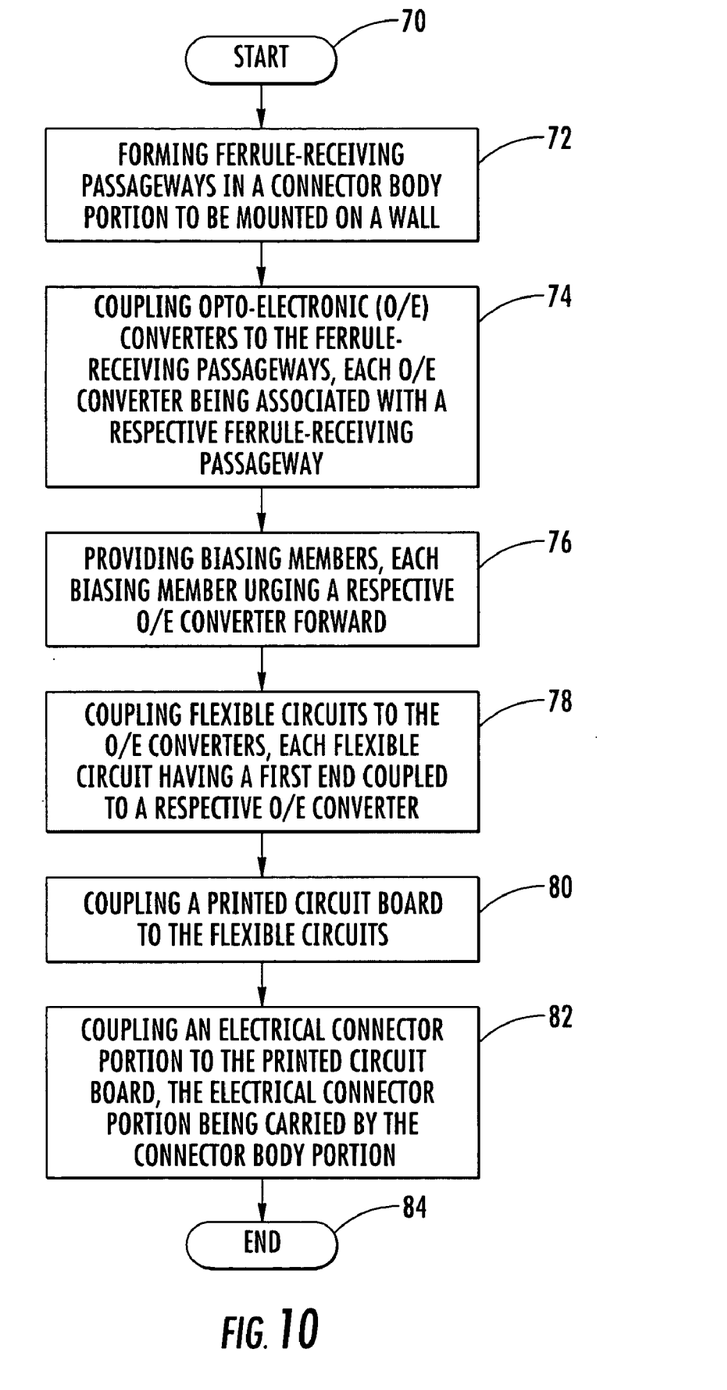
FIG. 10 is a flowchart of a method for making a wall mount fiber optic connector in accordance with the present invention.

Assembly of the wall mount fiber optic connector 20 will now be discussed with reference to FIGS. 6–9, along with a corresponding method for making the same with reference to the flowchart illustrated in FIG. 10. From the start Block 70, the plurality of ferrule-receiving passageways 22 to be carried by the connector body portion 24 are formed at Block 72, with the connector body portion to be mounted on the wall mount 12. The plurality of O/E converters 26 are coupled to the plurality of ferrule-receiving passageways 22 at Block 74, with each O/E converter having an optical path aligned with a corresponding ferrule-receiving passageway carried by the connector body portion 24.

Figure 6:
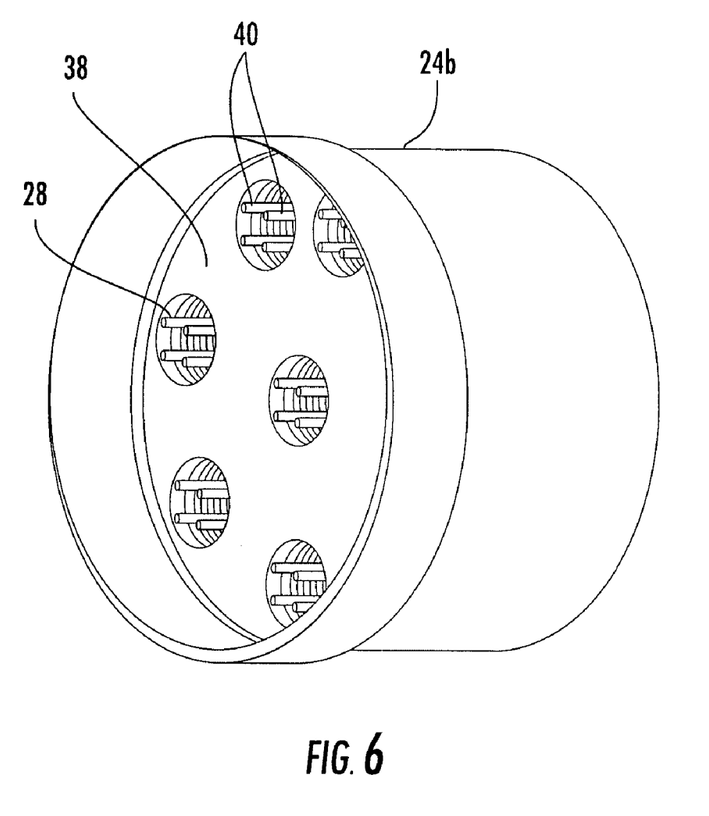
FIGS. 6–9 are perspective views illustrating assembly of the wall mount fiber optic connector in accordance with the present invention.

The method further comprises providing at Block 76 a respective biasing member 28 urging each O/E converter 26 forward. In one assembly step as illustrated in FIG. 6, the O/E converters 26, the biasing members 28 and the spring plate 38 are assembled and placed in the subassembly retainer 24b.

Figure 7:
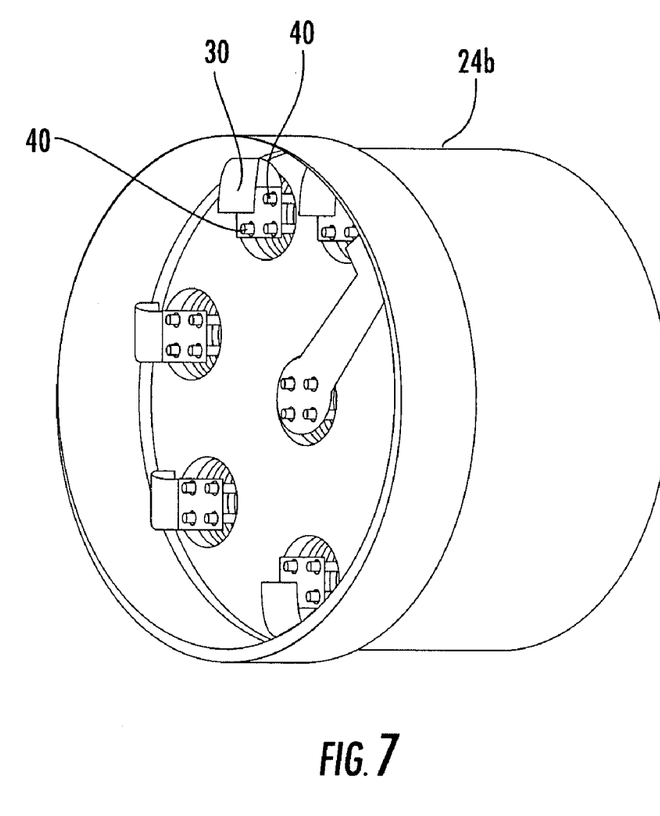

The method further comprises coupling a plurality of flexible circuits 30 at Block 78 to the plurality of O/E converters 26. In another assembly step as illustrated in FIG. 7, the individual flexible circuits 30 are attached to the conductive leads 40 of the O/E converters 26.

The method further comprises coupling at least one printed circuit board 32 to the plurality of flexible circuits at Block 80. The forward printed circuit board 32a is attached to the individual flexible circuits 30, and the rearward printed circuit board 32b is attached to the electrical connector 34. As illustrated in FIG. 8, an end cover 24c is removably coupled to an end of the subassembly retainer 24b.

An electrical connector portion 34 is coupled to the rearward printed circuit board 32b at Block 82. The keyed subassembly retainer 24b is now inserted into the carrier body section 24 as illustrated in FIG. 9. The wall mount fiber optic connector 20 is ready to be mounted to the wall 12 of the electronic system 10, and the method ends at Block 84.

The wall mount fiber optic connector 20 is an active connector because it converts optical signals to electrical signals, and electrical signals to optical signals on respective receive and transmit paths within the connector itself. This is significantly different from a passive connector in which optical signals are merely passed through, i.e., no electrical-to-optical or optical-to-electrical conversion takes place in the connector.

Figure 11:
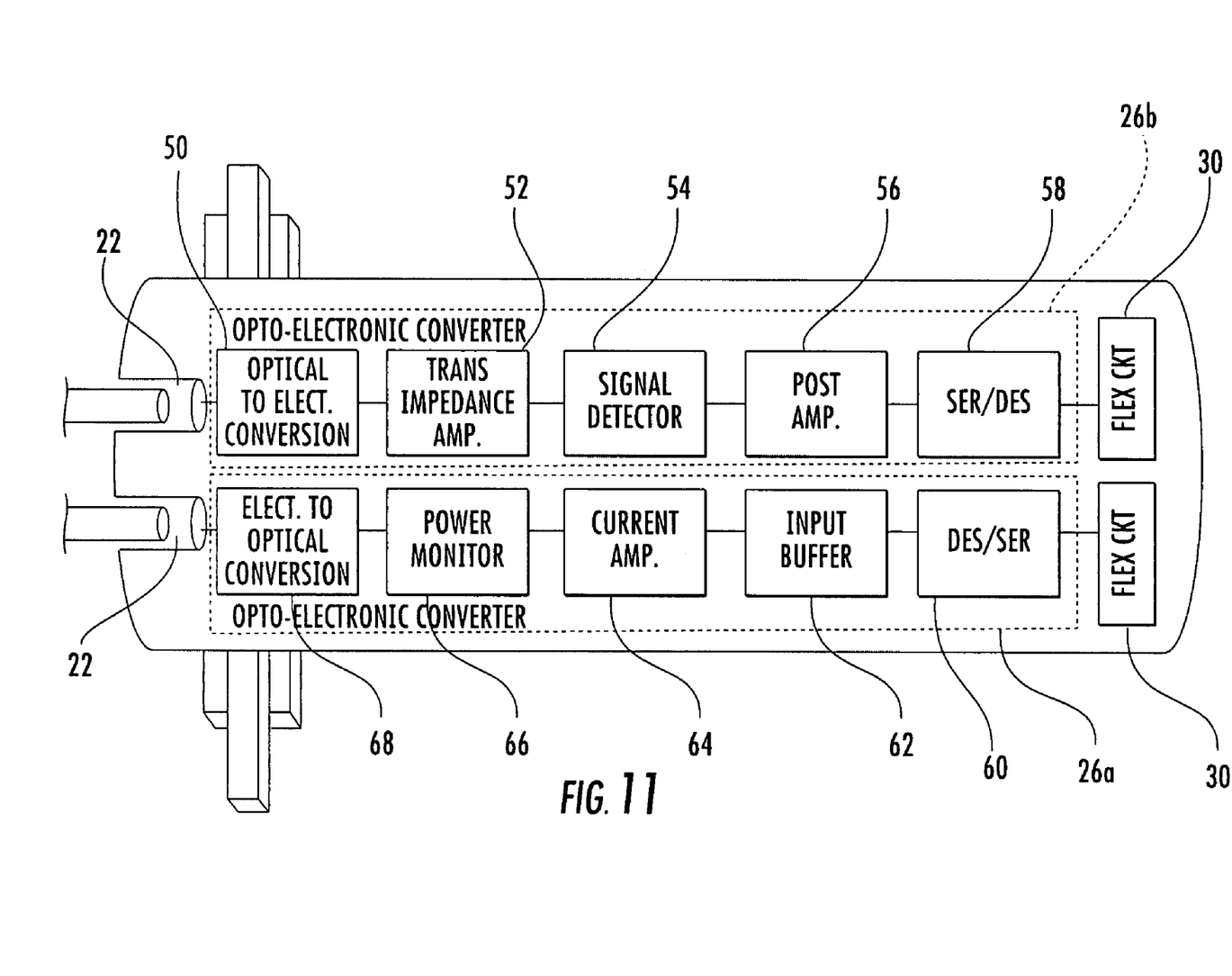
FIG. 11 is a block diagram of the opto-electronic converters for a receive path and transmit path within the wall mount fiber optic connector in accordance with the present invention.

The wall mount fiber optic connector 20 includes separate receive and transmits paths as best illustrated in FIG. 11. The plurality of O/E converters 26 comprise at least one transmitter optical subassembly (TOSA) 26a for converting an electrical signal to an optical signal, and at least one receiver optical subassembly (ROSA) 26b for converting an optical signal to an electrical signal.

In the ROSA 26b (i.e., the receive path), a PIN device 50, such as a diode, converts the received optical signal to an electrical signal. The electrical signal is amplified by a trans-impedance amplifier 52. A signal detector 54 detects if the electrical signal contains information or only noise. The output of the signal detector 54 is provided to a post amplifier 56 for amplifying the electrical signal to a final logic level that is compatible with the electrical circuit 16.

The wall mount fiber optic connector 20 may also be configured so that it is transmit only or receive only. Consequently, the wall mount fiber optic connector 20 may be configured with only TOSAs 26a or only ROSAs 26b, as readily appreciated by those skilled in the art. Indeed, the wall mount fiber optic connector 20 may be configured so that it has only one ROSA 26b or only one TOSA 26a.

Since the optical signals are in a serial format and the electrical circuit 16 prefers a parallel format for faster processing, a serializer/deserializer 58 changes the electrical signal from a serial format to a parallel format. The serializer/deserializer 58 then interfaces with a corresponding flexible circuit 30. The parallel or serial communication protocols of the optical signals may be compatible with Fibre Channel, Gigabit Ethernet or InfiBand, for example. Of course, the wall mount fiber optic connector 20 may be configured so that it is compatible with other parallel or serial communication protocols, as readily appreciated by those skilled in the art.

In the TOSA 26a (i.e., the transmit path), a deserializer/serializer 60 receives an electrical signal from the corresponding flexible circuit 30, and changes the electrical signal from a parallel format to a serial format. The electrical signal is provided to an input buffer 62 for isolation. The electrical signal is than amplified to a sufficient current level by a current amplifier 64. A power monitor 66 determines the power of the optical signal that is to be transmitted. The electrical signal drives a light emitting device 68, such as a laser, for converting the electrical signal to an optical signal.

Each ROSA 26b and TOSA 26a has four conductive leads 40 extending therefrom for connecting to a corresponding flexible circuit 30. In the ROSA 26b, there is a conductive lead for power, a conductive lead for ground, and two conductive leads for data. In the TOSA 26a, there is a conductive lead for power, two conductive leads for the light emitting device 68, and a monitoring conductive lead for providing feedback with respect to the light emitting device.

The transmit and receive paths are separate within the wall mount fiber optic connector 20. Consequently, for a one duplex optical channel, there is a single ROSA 26b and a single TOSA 26a. For four duplex optical channels, there are four ROSAs 26b and four TOSAs 26a. In lieu of multiple ROSAs 26b and TOSAs 26a for a plurality of optical channels, wave division multiplexing (WDM) may be used so that one optical channel transmits and receives the equivalent of multiple channels, as readily understood by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A wall mount fiber optic connector comprising:
   a connector body portion to be mounted on a wall, and having at least one ferrule-receiving passageway therein;
   at least one opto-electronic (O/E) converter associated with the at least one ferrule-receiving passageway;
   at least one flexible circuit having a first end coupled to said at least one O/E converter and having a second end;
   at least one printed circuit board coupled to the second end of said at least one flexible circuit;
   an electrical connector portion carried by said connector body portion and coupled to said at least one printed circuit board;
   a spring plate between said at least one printed circuit board and said at least one O/E converter; and
   at least one spring between said spring plate and said at least one O/E converter urging said at least one O/E converter forward.

2. A wall mount fiber optic connector according to claim 1 wherein said at least one spring is under compression.

3. A wall mount fiber optic connector according to claim 2 wherein said spring plate is also between said at least one flexible circuit and said at least one O/E converter.

4. A wall mount fiber optic connector according to claim 3 wherein said at least one O/E converter comprises a plurality of conductive leads extending rearwardly therefrom and is coupled to a corresponding flexible circuit; and wherein said spring plate includes at least one opening therein aligned with said plurality of conductive leads.

5. A wall mount fiber optic connector according to claim 1 wherein said connector body portion comprises:
   a wall mount flange;
   a subassembly retainer carried by said wall mount flange and retaining said at least one O/E converter therein; and
   an end cover removably coupled to an end of said subassembly retainer.

6. A wall mount fiber optic connector according to claim 5 wherein said subassembly retainer and said wall mount flange have a keyed fitting arrangement therebetween.

7. A wall mount fiber optic connector according to claim 1 wherein said at least one printed circuit board comprises a forward printed circuit board coupled to said at least one flexible circuit, and a rearward printed circuit board coupled to said electrical connector portion.

8. A wall mount fiber optic connector according to claim 1 wherein said at least one O/E converter comprises at least one transmitter optical subassembly (TOSA) for converting an electrical signal to an optical signal, and at least one receiver optical subassembly (ROSA) for converting an optical signal to an electrical signal.

9. A wall mount fiber optic connector according to claim 8 wherein each electrical signal is in a parallel format and each optical signal is in a serial format; wherein each TOSA comprises a deserializer/serializer for converting an electrical signal to be transmitted from the parallel format to the serial format; and wherein each ROSA comprises a serializer/deserializer for converting a received optical signal from the serial format to the parallel format.

10. A wall mount fiber optic connector according to claim 1 wherein said connector body portion is cylindrically shaped.

11. A wall mount fiber optic connector comprising:
   a connector body portion to be mounted on a wall, and having a plurality of ferrule-receiving passageways therein;
   a plurality of opto-electronic (O/E) converters, each O/E converter being associated with a respective ferrule-receiving passageway;
   a plurality of springs, each spring urging a respective O/E converter forward;
   a plurality of flexible circuits, each flexible circuit having a first end coupled to a respective O/E converter and having a second end;
   at least one printed circuit board coupled to the second ends of said plurality of flexible circuits; and
   an electrical connector portion carried by said connector body portion and coupled to said at least one printed circuit board;
   said connector body portion comprising
   a wall mount flange,
   a subassembly retainer carried by said wall mount flange and retaining said plurality of O/E converters therein, and
   an end cover removably coupled to an end of said subassembly retainer.

12. A wall mount fiber optic connector according to claim 11 further comprising a spring plate between said plurality of flexible circuits and said plurality of O/E converters; and wherein said springs are under compression between said spring plate and said O/E converters.

13. A wall mount fiber optic connector according to claim 12 wherein each O/E converter comprises a plurality of conductive leads extending rearwardly therefrom and being coupled to a corresponding flexible circuit; and wherein said spring plate includes a plurality of openings therein aligned with said plurality of conductive leads.

14. A wall mount fiber optic connector according to claim 11 wherein each respective spring is under tension.

15. A wall mount fiber optic connector according to claim 11 wherein said subassembly retainer and said wall mount flange have a keyed fitting arrangement therebetween.

16. A wall mount fiber optic connector according to claim 11 wherein said at least one printed circuit board comprises a forward printed circuit board coupled to said plurality of flexible circuits, and a rearward printed circuit board coupled to said electrical connector portion.

17. A wall mount fiber optic connector according to claim 11 wherein said plurality O/E converters comprise at least one transmitter optical subassembly (TOSA) for converting an electrical signal to an optical signal, and at least one receiver optical subassembly (ROSA) for converting an optical signal to an electrical signal.

18. A wall mount fiber optic connector according to claim 17 wherein each electrical signal is in a parallel format and each optical signal is in a serial format; wherein each TOSA comprises a deserializer/serializer for converting an electrical signal to be transmitted from the parallel format to the serial format; and wherein each ROSA comprises a serializer/deserializer for converting a received optical signal from the serial format to the parallel format.

19. An electronic system comprising:
    a housing including a wall;
    an electrical circuit carried by said housing;
    at least one wall mount fiber optic connector comprising
        a connector body portion mounted on the wall of said housing, and having at least one ferrule-receiving passageway therein,
        at least one opto-electronic (O/E) converter associated with the at least one ferrule-receiving passageway,
        at least one biasing member urging said at least one O/E converter forward,
        at least one flexible circuit having a first end coupled to said at least one O/E converter and having a second end,
        at least one printed circuit board coupled to the second end of said at least one flexible circuit,
        an electrical connector portion carried by said connector body portion and coupled to said at least one printed circuit board,
        a spring plate between said at least one printed circuit board and said at least one O/E converter, and
        at least one spring between said spring plate and said at least one O/E converter urging said at least one O/E converter forward; and
    cable between said electrical connector portion and said electrical circuit.

20. An electronic system according to claim 19 wherein said at least one spring is under compression.

21. An electronic system according to claim 20 wherein said spring plate is also between said at least one flexible circuit and said at least one O/E converter.

22. An electronic system according to claim 21 wherein said at least one O/E converter comprises a plurality of conductive leads extending rearwardly therefrom and being coupled to a corresponding flexible circuit; and wherein said spring plate includes at least one opening therein aligned with said plurality of conductive leads.

23. An electronic system according to claim 19 wherein said connector body portion comprises:
    a wall mount flange;
    a subassembly retainer carried by said wall mount flange and retaining said at least one O/E converter therein; and
    an end cover removably coupled to an end of said subassembly retainer.

24. An electronic system according to claim 23 wherein said subassembly retainer and said wall mount mounting flange have a keyed fitting arrangement therebetween.

25. An electronic system according to claim 19 wherein said at least one printed circuit board comprises a forward printed circuit board coupled to said at least one flexible circuit, and a rearward printed circuit board coupled to said electrical connector portion.

26. An electronic system according to claim 19 wherein said at least one O/E converter comprises at least one transmitter optical subassembly (TOSA) for converting an electrical signal to an optical signal, and at least one receiver optical subassembly (ROSA) for converting an optical signal to an electrical signal.

27. An electronic system according to claim 26 wherein each electrical signal is in a parallel format and each optical signal is in a serial format; wherein each TOSA comprises a deserializer/serializer for converting an electrical signal to be transmitted from the parallel format to the serial format; and wherein each ROSA comprises a serializer/deserializer for converting a received optical signal from the serial format to the parallel format.

28. An electronic system according to claim 19 wherein said connector body portion is cylindrically shaped.

29. A method for making a wall mount fiber optic connector comprising:
    forming at least one ferrule-receiving passageway in a connector body portion to be mounted on a wall;
    coupling at least one opto-electronic (O/E) converter to the at least one ferrule-receiving passageway;
    coupling a first end of at least one flexible circuit to the at least one O/E converter;
    coupling at least one printed circuit board to a second end of the at least one flexible circuit;
    coupling an electrical connector portion to the at least one printed circuit board, the electrical connector portion being carried by the connector body portion;
    providing a spring plate between the at least one printed circuit board and the at least one O/E converter; and
    positioning at least one spring between the spring plate and the at least one o/E converter for urging the at least one O/E converter forward.

30. A method according to claim 29 wherein the at least one spring is under compression.

31. A method according to claim 30 wherein the spring plate is also between the at least one flexible circuit and the at least one O/E converter.

32. A method according to claim 31 wherein the at least one O/E converter comprises a plurality of conductive leads extending rearwardly therefrom and being coupled to a corresponding flexible circuit; and wherein the spring plate includes at least one opening therein aligned with the plurality of conductive leads.

33. A method according to claim 29 wherein the connector body portion comprises a wall mount flange; a subassembly retainer carried by the wall mount flange and retaining the at least one O/E converter therein; and an end cover removably coupled to an end of the subassembly retainer.

34. A method according to claim 33 wherein the subassembly retainer and the wall mount mounting flange have a keyed fitting arrangement therebetween.

35. A method according to claim 29 wherein the at least one printed circuit board comprises a forward printed circuit board coupled to the at least one flexible circuit, and a rearward printed circuit board coupled to the electrical connector portion.

36. A method according to claim 29 wherein the at least one O/E converter comprise at least one transmitter optical subassembly (TOSA) for converting an electrical signal to an optical signal, and at least one receiver optical subassembly (ROSA) for converting an optical signal to an electrical signal.

37. A method according to claim 29 wherein the connector body portion is cylindrically shaped.

* * * * *

UNITED STATES PATENT AND TRADEMARK OFFICE
CERTIFICATE OF CORRECTION

PATENT NO. : 7,093,985 B2 Page 1 of 1
APPLICATION NO. : 10/889148
DATED : August 22, 2006
INVENTOR(S) : Lord et al.

It is certified that error appears in the above-identified patent and that said Letters Patent is hereby corrected as shown below:

Column 9, Line 14  Delete: "plurality O/E"
Insert: -- plurality of O/E --

Column 10, Line 47  Delete: "o/E"
Insert: -- O/E --

Signed and Sealed this

Thirtieth Day of January, 2007

JON W. DUDAS
*Director of the United States Patent and Trademark Office*